United States Patent
Gao et al.

(10) Patent No.: US 8,663,373 B2
(45) Date of Patent: Mar. 4, 2014

(54) FREE RADICAL INJECTION IONIZER FOR FLUE GAS TREATMENT WITH CORONA DISCHARGE

(76) Inventors: Xiang Gao, Hangzhou (CN); Zhongyang Luo, Hangzhou (CN); Kefa Cen, Hangzhou (CN); Mingjiang Ni, Hangzhou (CN); Zuliang Wu, Hangzhou (CN); Yi Zhong, Hangzhou (CN); Yongxin Zhang, Hangzhou (CN); Dian Xu, Hangzhou (CN); Weihong Wu, Hangzhou (CN); Zhenglun Shi, Hangzhou (CN); Jinsong Zhou, Hangzhou (CN); Mengxiang Fang, Hangzhou (CN); Chunjiang Yu, Hangzhou (CN); Shurong Wang, Hangzhou (CN); Leming Cheng, Hangzhou (CN); Qinhui Wang, Hangzhou (CN)

( * ) Notice: Subject to any disclaimer, the term of this patent is extended or adjusted under 35 U.S.C. 154(b) by 350 days.

(21) Appl. No.: 13/123,767

(22) PCT Filed: May 7, 2010

(86) PCT No.: PCT/CN2010/072503
§ 371 (c)(1),
(2), (4) Date: Apr. 12, 2011

(87) PCT Pub. No.: WO2011/057486
PCT Pub. Date: May 19, 2011

(65) Prior Publication Data
US 2011/0296996 A1 Dec. 8, 2011

(30) Foreign Application Priority Data
Nov. 16, 2009 (CN) .......................... 2009 1 0153851

(51) Int. Cl.
*B03C 3/013* (2006.01)

(52) U.S. Cl.
USPC ................ 96/43; 95/58; 96/48; 96/50; 96/52; 96/97

(58) Field of Classification Search
USPC ...................... 96/43, 48, 50, 52, 95–97; 95/58
See application file for complete search history.

(56) References Cited

U.S. PATENT DOCUMENTS 1,399,441 A * 12/1921 Petersen ........................... 96/43
3,768,258 A * 10/1973 Smith et al. ...................... 60/275

(Continued)

FOREIGN PATENT DOCUMENTS

| CN | 1600468 A | | 3/2005 | |
|----|-----------|---|--------|---|
| JP | 53-2767 A | * | 1/1978 | ........................ 96/97 |
| JP | 9141044 A | | 6/1997 | |

OTHER PUBLICATIONS

Wei En-zong, "Experimental and Theoretical Study on Flue Gas Denitrifteatrnn by DC Corona Oxidation Integrating with Chemical Scrubber", Apr. 2006, College of Mechanical and Energy Engineering, Zhejiang University, Hangzhou, 310027, P. R. China.

*Primary Examiner* — Richard L Chiesa
(74) *Attorney, Agent, or Firm* — Rabin & Berdo, P.C.

(57) ABSTRACT

A free radical injection ionizer for flue gas treatment with corona discharge includes an injection device for releasing free radical source substances and an electrode device for producing corona, wherein the injection device and the electrode device are arranged separately, wherein the electrode device includes a conductive pole, and discharge tips arranged on the upper and lower sides of the conductive pole at equal intervals, and the injection device includes nozzles symmetrically arranged on two sides of the electrode device, and two lines of holes axially arranged on the walls of the nozzles nearby the electrode device, the axial lines of the holes directing the discharge tips nearest the holes.

12 Claims, 3 Drawing Sheets

(56) References Cited

U.S. PATENT DOCUMENTS

| | | | |
|---|---|---|---|
| 4,966,610 A * | 10/1990 | Krigmont et al. | 95/58 |
| 5,667,563 A * | 9/1997 | Silva, Jr. | 96/50 |
| 5,843,210 A * | 12/1998 | Paranjpe et al. | 95/59 |
| 6,905,029 B2 * | 6/2005 | Flagan | 209/210 |
| 7,115,153 B2 * | 10/2006 | Ahlborn et al. | 95/74 |
| 7,399,340 B2 * | 7/2008 | Strauss | 95/57 |
| 2006/0207428 A1 * | 9/2006 | Ibe et al. | 96/52 |
| 2007/0151448 A1 * | 7/2007 | Taylor et al. | 95/57 |

* cited by examiner

FREE RADICAL INJECTION IONIZER FOR FLUE GAS TREATMENT WITH CORONA DISCHARGE

FIELD OF THE INVENTION

The invention relates to the technical field of waste gas treatment, and in particular, to a free radical injection ionizer for flue gas treatment with corona discharge.

BACKGROUND OF THE INVENTION

The technique for simultaneously removing flue gas pollutants by the non-thermal equilibrium plasma is one of the most promising comprehensive flue gas treatment techniques currently, which uses particles with high reactivity produced from gas discharge to react with various organic and inorganic pollutant molecules which are thereby decomposed and oxidized into harmless substances or easily treatable compounds. This technique has the characteristic of effectively, conveniently and non-selectively decomposing various pollutants by using simple equipment and small space, therefore it is adaptive to various working environments, and as a result, the application of non-thermal equilibrium plasma technique for simultaneously controlling pollutants in flue gas has drawn the universal concern at home and abroad, and the related techniques have been at the stage of commercial application based on plenty of basic principle researches and technical popularization. At present, the most used plasma flue gas treatments are electron beam process, pulse corona process and direct current corona process.

During the removal of pollutants by using the electron beam process, $N_2$, $O_2$, $CO_2$, vapor and the like absorb most electron beam energy after the irradiation of the electron beam to produce various free radicals including OH, O, $HO_2$ and other particles with high reactivity. The free radicals are capable of oxidizing $SO_2$ and $NO_x$ in the flue gas to produce sulfuric acid and nitric acid which would then be neutralized by the pre-introduced ammonia to produce ammonium sulfate and ammonium nitrate. The Ebara Corporation in Japan started the research on the technique of irradiating flue gas by electron beam for desulfuration and denitration in 1970, cooperated with the Japan Atomic Energy Research Institute in 1972, treated heavy oil combustion waste gas and performed experiments on the scale of 1000 $Nm^3/h$ with the radiation effect of the addition of ammonia detected, the conditions for desulfuration and denitration stabilized and the byproducts, ammonium sulfate and ammonium nitrate, entrapped successfully in 1974, and cooperated with the Research Institute for Controlling $NO_x$ of Steel Industry, and performed experiments on the scale of 10000 $Nm^3/h$ of sintering waste gas furnaces in 1977, so that the dry technique was affirmed. However, the main gas molecules in the high-energy electron pair flue gas produced from the electron beam process can break down the chemical bonds thereof, and decompose and ionize gas molecules with high content, such as $N_2$ and $CO_2$, in the flue gas, causing energy waste and large energy consumption in the process. Furthermore, the problems of expensive electron gun, shot longevities of electron gun and target window, complex equipment structure, large space, ammonia escape, shielding and protection of X-ray and the like are existing.

The pulse corona process may fast accelerate electrons within nanosecond-scale time, so that the electrons obtain larger energy, while less energy can accelerate the more massive ions, so as to greatly reduce the energy waste caused by the ion acceleration; meanwhile, the pulse corona process may reach a higher voltage peak to form a higher discharge intensity, making the high-energy electron energy reach 5-20 eV. The pulse corona process has been being widely researched since 1980s. In 1986, Masuda proposed a pulse corona discharge process of replacing electron accelerator with pulse high-voltage power supply above tens of thousands of volts to produce plasma, and performed plenty of fundamental researches which showed that NO and $SO_2$ were capable of effectively being oxidized into $NO_2$ and $SO_3$ by the pulse corona plasma chemical process. The Research Institute of Dalian University of Technology for Electrostatic and Special Power Supplies created a desulfuration device of 3000 $Nm^3/h$, in 1996; Lee et al. created a large reaction device for simultaneous desulfuration and denitration by using pulse plasma technique, with the capacity of 42000 $Nm^3/h$, and the desulfuration and denitration rates respectively of 99% and 70% by using ammonia free radical and propylene free radical under the energy consumption condition of 1.4 $Wh/m^3$, in 2003. The energy consumption of the pulse corona process was only 50% of that of the electron beam process, but the pulse corona process still took effect and apply to ionize gas molecules, such as $N_2$ and $CO_2$, in the flue gas, resulting in energy waste. In addition, during the actual application of the electron beam process or pulse corona process, ammonia gas is usually added as absorbent and incapable of complete reaction, resulting in leakage and pollution to the surroundings after being discharged into the air.

The direct current corona discharge is a discharge form produced by the non-uniform electric field distribution between electrodes under the action of direct current and high voltage. The direct current corona discharge shares the similar working principle as the pulse corona discharge's, and has the advantages of simple discharge power supply, wide application of high-power direct current power supply in the electrostatic precipitation field, and mature and reliable technique. Chang et al. constructed a flue gas purification demonstration project of 1000-1500 $Nm^3/h$ for desulfuration and denitration of flue gas with direct current corona ammonia injection free radical shower with the removal rates of NO and $SO_2$ of 75% and 99% respectively, and the energy consumptions of 125 g NO/kWh and 9 g $SO_2$/kWh respectively.

In the pulse and direct current corona discharge pollutants removal systems, if the conventional discharge electrode structures are used, such as wire-cylinder structure and wire-plate structure, the corona zone of flue gas direct current corona discharge is smaller and only limited to the proximity of wire electrodes, and the discharge current is weaker, so that the pollutants removal effect is poor. If multi-pin and one-plate discharge structure is used, although the corona discharge zone and discharge current are increased, the energy consumption is larger.

For the deficiencies above, someone proposed to use the nozzle-type discharge electrode. China patent, Public Number CN1600408A filed on Mar. 30, 2005, discloses a discharge nozzle electrode for the direct current flue gas treatment with corona discharge, including a main pipe open at one end and sealed at the other end, and multiple nozzles symmetrically arranged on the main pipe. The additive gases introduced in the discharge nozzle electrode are ionized in the corona zone to produce plenty of active substances capable of reacting with the pollutants, so as to remove the contaminations. In addition, the different additive gases are capable of being decomposed in the corona zone to produce different free radicals so as to be selected correspondingly according to the objects to be treated in the flue gas. With the electrode design, the air velocity in the nozzles is faster than the flue gas velocity in a reactor, so that the free radicals produced can be better transferred and contact with and oxidize the contaminations. The electrode is advantaged in that the additive gases are ionized to a great extent in the corona zone nearby the nozzles, and the flow of the gases at the nozzle mouths can make the corona discharge more stable, so as to produce stable streamer corona across the whole discharge air gap. However, the additive gases are sprayed out from the ends of the nozzles, and the experimental result of the flow ionization zones is shown in FIG. 7, from which it can be seen that the flow ionization zones 13 are so concentrated, the free radicals 14 produced are mainly concentrated between the nozzles of electrodes 2 and upper and lower electrode plates 11, and the flue gas through its channel 12 is easy to pass through the gaps between the electrodes, without reacting with the free radicals produced by the decomposition in the corona zone, thereby influencing the treatment effect. If the electrodes are arranged more densely, the energy consumption of the system will be considerably increased. In addition, such hollow electrode is difficult to process and has high cost, upon which the investment on the equipment for engineering application will be obviously increased.

SUMMARY OF THE INVENTION

The invention incorporating good flue gas treatment effect, low energy consumption and small equipment investment provides a free radical injection ionizer for flue gas treatment with corona discharge to solve the problems of poor flue gas treatment effect, high energy consumption and large equipment investment of the current devices for flue gas treatment with non-thermal equilibrium plasma techniques.

To achieve the technical purpose above, the invention adopts the specific technical scheme: a free radical injection ionizer for flue gas treatment with corona discharge arranged in a flue gas channel and comprising an injection device for releasing free radical source substances and a separately arranged electrode device for producing corona. The electrode device comprises a conductive pole, and discharge tips arranged on the upper and lower sides of the conductive pole at equal intervals. The injection device comprises nozzles symmetrically arranged on two sides of the electrode device, and two lines of holes axially arranged on the wall of the nozzles nearby the electrode device. The holes are arranged at equal intervals with each other and with the discharge tips, and the axial lines of the holes direct the discharge tips nearest the holes. The injection device and electrode device are separately arranged and the axial lines of the holes are directed toward the discharge tips nearest the holes, so that the free radial source substances sprayed out from the insulated nozzles on two sides of the electrodes are crosswise mixed with larger distribution zones. The experimental result of the free radical source substance discharge zone is shown in FIG. 8, from which it can be seen that, compared with the prior art, the free radical source substance discharge zone is larger and more well-distributed. Although the ionization degree of the free radical source substances nearby the discharge ends of the electrodes is possibly lower than that at the nozzle tips of the nozzle structure, on the whole, the free radicals produced by the free radical injection ionizer of the invention widely contact with the flue gas, so that the removal efficiency of the flue gas is higher, and the whole effect is obviously better than that of the discharge electrode of the nozzle structure. In addition, in the circumstance of the same flue gas treatment effect, the structure of the invention is obviously capable of reducing the electrode quantity, so as to considerably reduce the energy consumption; moreover, the structure of the invention requires no hollow nozzles on two sides of one electrode, and is simply structured, so as to effectively reduce the production cost. The method is adaptive to the direct current corona discharge as well as the pulse corona process.

As a preferred embodiment, the setting of discharge tips on the upper and lower sides of the conductive pole are symmetric or staggered. The settings of holes on the nozzles are symmetric or staggered, and are adapted to the discharge tips on the conductive pole. The holes on the nozzles correspond to the electrodes in quantity and position, i.e., one hole injects free radical source substances to one electrode tip to ensure the best ionization effect of the free radical source substances.

As a preferred embodiment, the holes are provided with flexible guiding hoses whose outlets are provided with well-distributed radial apertures. The holes are provided with flexible guiding hoses in the injection directions thereof, so that the flexible guiding hoses will irregularly wave or shake under the action of the flow injected from the holes. The flexible guiding hoses are provided with well-distributed radial apertures at the outlets thereof, so that the irregular waving or shaking may be further enhanced, upon which, the free radical source substances injected from the flexible guiding hoses have a larger range, and also the free radicals produced after the ionization of the free radical source substances have a larger distribution range to contact with more flue gas and improve the flue gas treatment effect.

As a preferred embodiment, the discharge tips are conical, cylindrical or serrated sharp, the ratio of the intervals of the discharge tips to the length of the discharge tips has a range of 3 to 1 to 5 to 1, and the number of each line of discharge tips on the conductive pole is 812.

As a preferred embodiment, the discharge tips are serrated sharp and are symmetrically settled on the upper and lower sides of the conductive pole which is structured like a plate, and integrally formed with the conductive pole. The vertex angle of the serrated structure is 40-50 degrees. The serrated electrode is one of the common electrodes in electrostatic precipitators, so that the invention may further reduce cost, and implement the integral dust precipitation and purification by combining with electrostatic precipitators.

As a preferred embodiment, the diameter of the nozzles is less than the total height of the electrode device, and the included angle between the axial lines of holes on each side of the nozzles is 110-140 degrees. The diameter of the nozzles and the angle between the axial lines of holes on each side of the nozzles are corresponding to the relative positions of the nozzles and electrodes. Usually, too close or too far from the nozzles to the electrodes will influence the ionization effect of the free radical source substances, so it would be more rational that the diameter of the nozzles is less than the total height of the electrode device and the included angle between the axial lines of holes on each side of the nozzles is 110-140 degrees.

As a preferred embodiment, one end of one nozzle is a sealed end connected with a vibrator through a connecting rod, and the other end of the nozzle is connected with a free radical air source through a hose. The action of connecting one end of the nozzle with the vibrator is similar as that of arranging the flexible guiding hose on the holes of the nozzles, but the vibrator may change the injection direction or range of the free radical source substances by controlling the vibration amplitude, direction or frequency of the nozzles to make the whole flue gas treatment device reach the optimum treatment effect.

The invention has the advantages of effectively solving the problems of poor flue gas treatment effect, high energy consumption and large equipment investment existing in the current devices for the flue gas treatment with non-thermal equilibrium plasma techniques. It has simple structure, good flue gas treatment effect, low energy consumption, and capability of combining with electrostatic precipitators to implement the integral dust precipitation and purification.

PREFERRED EMBODIMENTS OF THE INVENTION

The specific implementation of the technical solution of the invention is described below in detail by referring to the following embodiments in conjunction with the figures attached.

Embodiment 1

Figure 1:
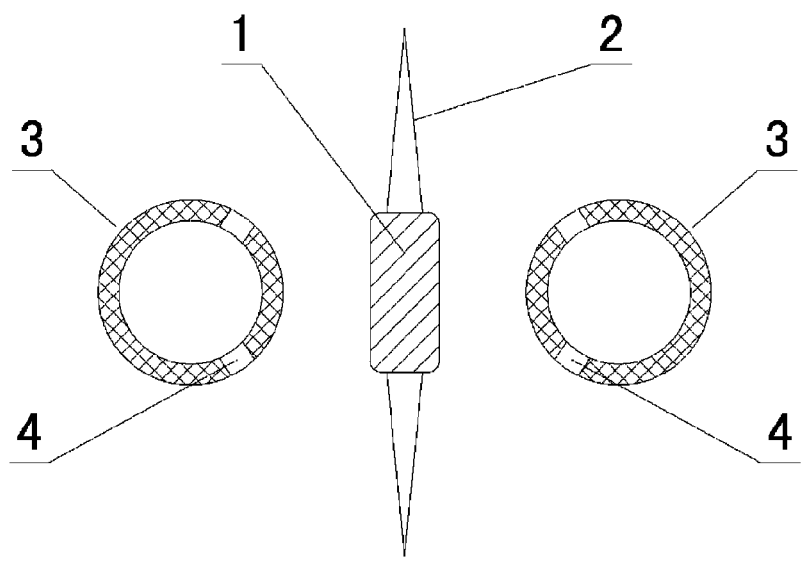
FIG. 1 illustrates a local structure perspective view of a free radical injection ionizer of the present invention.
Figure 2:
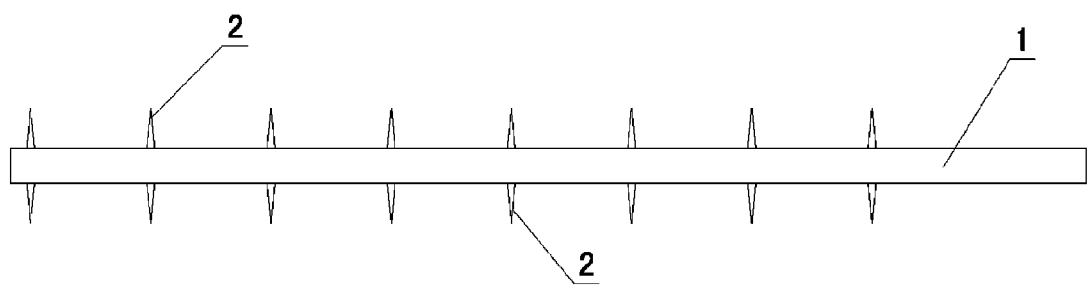
FIG. 2 illustrates a structure schematic of an electrode device of the free radical injection ionizer of the present invention.
Figure 3:
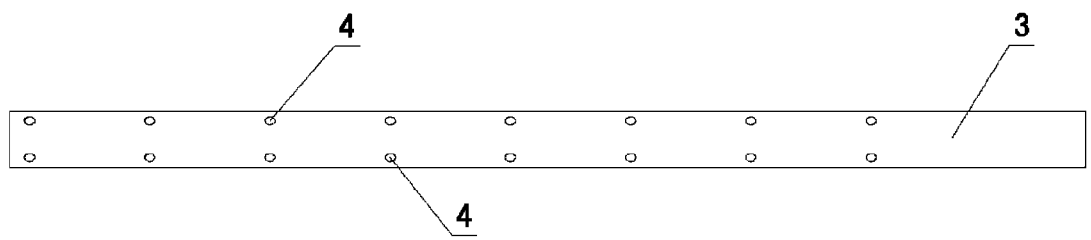
FIG. 3 illustrates a structure schematic of a nozzle of the free radical injection ionizer of the present invention.

In Embodiment 1 shown as FIG. 1, a free radical injection ionizer for the corona discharge flue gas treatment arranged in a flue gas channel in which the electrode plates are arranged on the upper and lower sides of the flue gas channel, comprising an injection device for releasing free radical source substances and an electrode device for producing corona. The injection device and the electrode device are separately arranged. The electrode device comprises a conductive pole 1, and conical discharge tips 2 arranged on the upper and lower sides of the conductive pole at equal intervals. The ratio of the intervals of the discharge tips to the length of the discharge tips is 3 to 1, and there are eight discharge tips on each line of the conductive pole (see FIG. 2). The injection device comprises nozzles 3 symmetrically arranged on two sides of the electrode device and connected with a free radical air source, in which the diameter of the nozzles is less than the total height of the electrode device, and two lines of symmetric holes 4 axially arranged on the walls of the nozzles nearby the electrode device (see FIG. 3). Wherein the included angle between the axial lines of holes on each side of the nozzles is 110 degrees, the holes are arranged at equal intervals with each other and with the discharge tips. The axial lines of the holes direct the discharge tips nearest the holes, and are on the same level of the axial lines of the discharge tips nearest the holes, and the number of the holes is identical to that of the electrodes.

Embodiment 2

Figure 4:
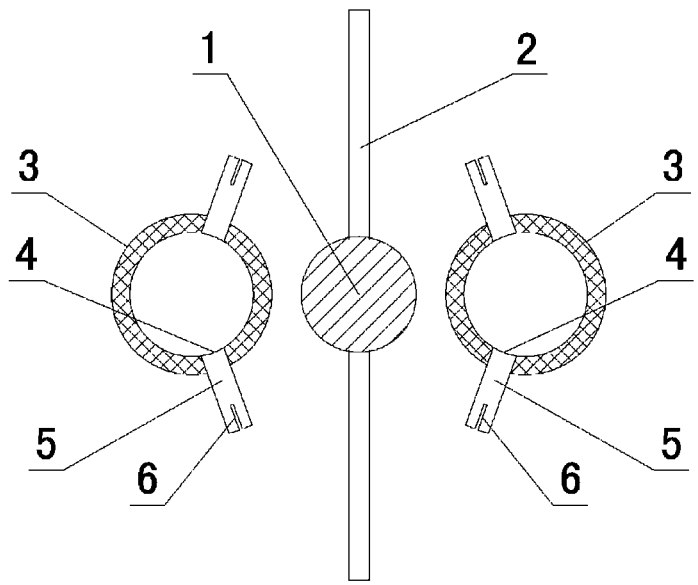
FIG. 4 illustrates another local structure perspective view of the free radical injection ionizer of the present invention.

The discharge tips of Embodiment 2 are cylindrical (see FIG. 4). The ratio of the intervals of the discharge tips to the length of the discharge tips is 5 to 1, and there are twelve discharge tips on each line of the conductive pole. The holes are provided with flexible guiding hoses 5 whose outlets are provided with well-distributed radial apertures 6. The rest of the embodiment is the same as Embodiment 1.

Embodiment 3

Figure 5:
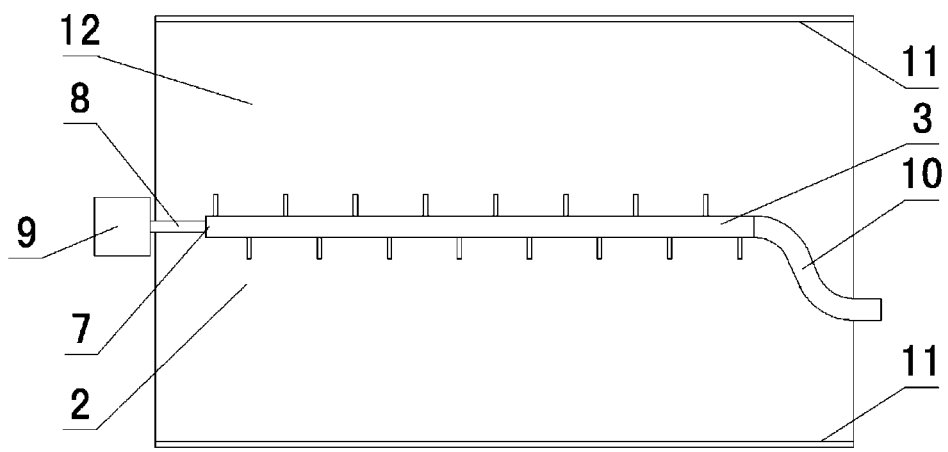
FIG. 5 illustrates a whole structure schematic of the free radical injection ionizer of the present invention.

The discharge tips on the upper and lower sides of the conductive pole of Embodiment 3 are staggered (see FIG. 5). The holes on the nozzles are staggered, and are adapted to the discharge tips. One end of the nozzle is a sealed end 7 connected with a vibrator 9 through a connecting rod 8, and the other end of the nozzle is connected with a free radical air source through a hose 10. The rest of the embodiment is the same as Embodiment 1.

Embodiment 4

Figure 6:
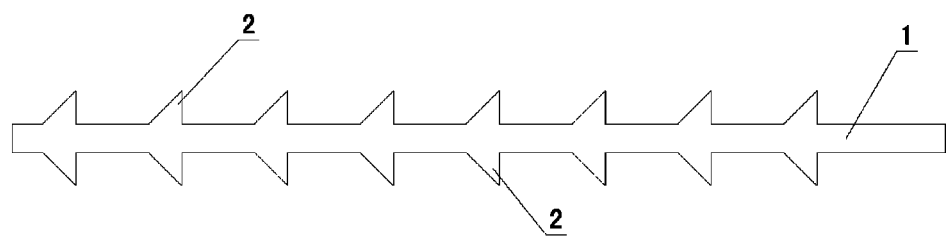
FIG. 6 illustrates another structure schematic of the electrode device of the free radical injection ionizer of the present invention.
Figure 7:
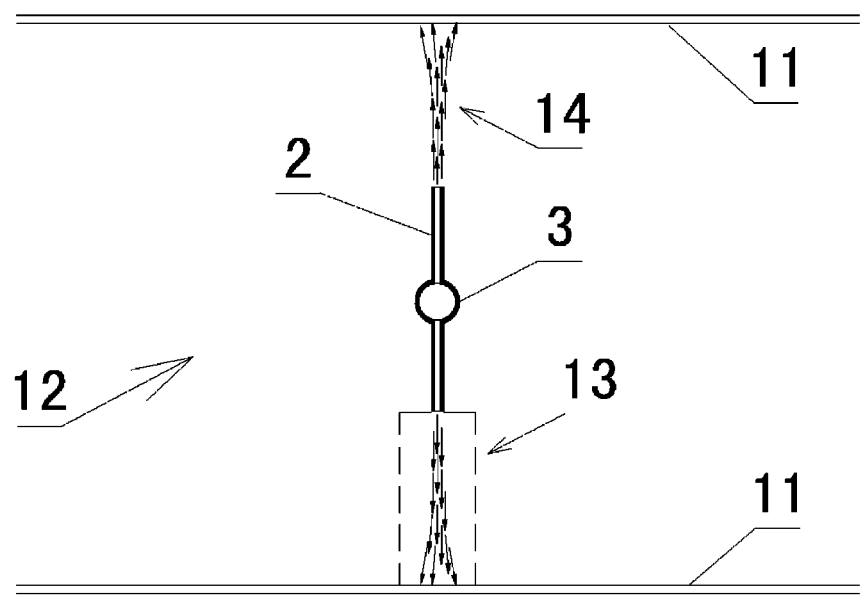
FIG. 7 illustrates an experimental result schematic of an ionization zone of an ionizer of the existing technology.
Figure 8:
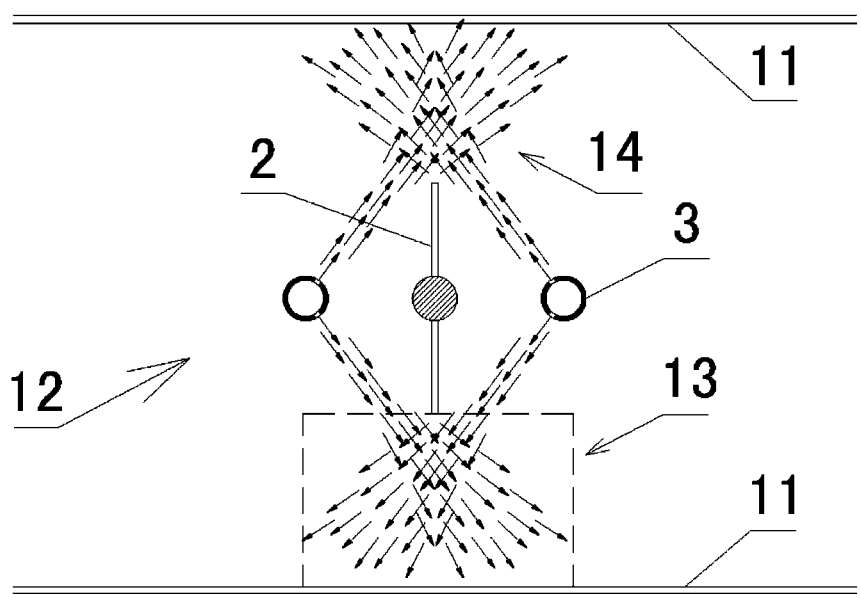
FIG. 8 illustrates an experimental result schematic of an ionization zone of the free radical injection ionizer of the present invention.

In Embodiment 4, the discharge tips are serrated and symmetric on the upper and lower sides of the conductive pole which is structured like a plate, and integrally formed with the conductive pole; and the vertex angle of the serrated structure is 45 degrees (see FIG. 6). The rest of the embodiment is the same as Embodiment 1.

When the free radical injection ionizer for flue gas treatment with corona discharge is operating, the flue gas passes through the flue gas channel 12. The electrode device in the flue gas channel and the electrode plates on the upper and lower sides of the flue gas channel exert direct current or pulse high voltage on the flue gas so as to produce corona discharge between the electrodes and the electrode plates. The nozzles on two sides of the electrode device spray out free radical source substances to the electrodes through the holes, and the free radical source substances produce highly active free radicals under the action of the corona to react with various organic and inorganic contamination molecules in the flue gas to have the contamination molecules decomposed and oxidized into harmless substances or easily treatable compounds, thus to reach the objective of flue gas treatment. Flexible guiding hoses are arranged in the injection directions of the holes, so that they will irregularly wave or shake under the action of the flow injected from the holes. Well-distributed radial apertures are arranged at the outlets of the flexible guiding hoses, so that the irregular waving or shaking may be further enhanced, upon which, the free radical source substances injected from the flexible guiding hoses have a larger range, and the free radicals produced after the ionization of the free radical source substances have a larger distribution range to contact with more flue gas, thus to improve the flue gas treatment effect. Additionally, connecting the nozzles with the vibrator to vibrate with it can also achieve the objective above. Compared with the flexible guiding hoses on the nozzles, the vibrator may change the injection direction or range of the free radical source substances by controlling the vibration amplitude, direction or frequency of the nozzles to make the whole flue gas treatment device reach the optimum treatment effect.

What is claimed is:

1. A free radical injection ionizer for flue gas treatment with corona discharge arranged in a flue gas channel comprising an injection device for releasing free radical source substances and an electrode device for producing corona, wherein the injection device and the electrode device are arranged separately, wherein the electrode device comprises a conductive pole, and discharge tips arranged on the upper and lower sides of the conductive pole at equal intervals; and the injection device comprises nozzles symmetrically arranged on two sides of the electrode device, and two lines of holes axially arranged on the walls of the nozzles nearby the electrode device, the holes being arranged at equal intervals with each other and with the discharge tips, and the axial lines of the holes are directed toward the discharge tips nearest the holes.

2. The free radical injection ionizer for flue gas treatment with corona discharge according to claim 1, wherein the discharge tips on the upper and lower sides of the conductive pole are symmetric or staggered; and the two lines of holes on each side of the nozzles are symmetric or staggered, and are adapted to the discharge tips on the conductive pole.

3. The free radical injection ionizer for flue gas treatment with corona discharge according to claim 1, wherein the holes are provided with flexible guiding hoses whose outlets are provided with well-distributed radial apertures.

4. The free radical injection ionizer for flue gas treatment with corona discharge according to claim 1, wherein the discharge tips are conical, cylindrical or serrated, the ratio of the intervals of the discharge tips to the length of the discharge tips is 3 to 1 to 5 to 1, and there are 8-12 discharge electrodes on each line of the conductive pole.

5. The free radical injection ionizer for flue gas treatment with corona discharge according to claim 4, wherein the discharge tips are serrated and symmetric or staggered on the upper and lower sides of the conductive pole which is plate-shaped, and integrally formed with the conductive pole; and the vertex angle of the serrated structure is 40-50 degrees.

6. The free radical injection ionizer for the corona discharge flue gas treatment according to claim 1, wherein the diameter of the nozzles is less than the total height of the electrode device, and the included angle between the axial lines of holes on each side of the nozzles is 110-140 degrees.

7. The free radical injection ionizer for flue gas treatment with corona discharge according to claim 1, wherein one end of the nozzle is a sealed end connected with a vibrator through a connecting bar, and the other end of the nozzle is connected with a free radical air source through a hose.

8. The free radical injection ionizer for flue gas treatment with corona discharge according to claim 2, wherein one end of the nozzle is a sealed end connected with a vibrator through a connecting bar, and the other end of the nozzle is connected with a free radical air source through a hose.

9. The free radical injection ionizer for flue gas treatment with corona discharge according to claim 3, wherein one end of the nozzle is a sealed end connected with a vibrator through a connecting bar, and the other end of the nozzle is connected with a free radical air source through a hose.

10. The free radical injection ionizer for flue gas treatment with corona discharge according to claim 4, wherein one end of the nozzle is a sealed end connected with a vibrator through a connecting bar, and the other end of the nozzle is connected with a free radical air source through a hose.

11. The free radical injection ionizer for flue gas treatment with corona discharge according to claim 5, wherein one end of the nozzle is a sealed end connected with a vibrator through a connecting bar, and the other end of the nozzle is connected with a free radical air source through a hose.

12. The free radical injection ionizer for flue gas treatment with corona discharge according to claim 6, wherein one end of the nozzle is a sealed end connected with a vibrator through a connecting bar, and the other end of the nozzle is connected with a free radical air source through a hose.

* * * * *